United States Patent [19]
Mehltretter et al.

[11] 3,949,093
[45] Apr. 6, 1976

[54] PROCESS FOR IMPROVING QUALITY OF PROTEIN-FORTIFIED BAKED GOODS

[75] Inventors: Charles L. Mehltretter, Peoria, Ill.; Maura M. Bean, Berkeley, Calif.

[73] Assignee: The United States of America as represented by the Secretary of Agriculture, Washington, D.C.

[22] Filed: Apr. 2, 1973

[21] Appl. No.: 347,086

[52] U.S. Cl. .................. 426/24; 426/549; 426/653
[51] Int. Cl.² .. A21D 2/14; A21D 2/26; A21D 13/06
[58] Field of Search ........ 426/23, 24, 152, 549, 653

[56] References Cited
UNITED STATES PATENTS 3,679,433   7/1972   Pomeranz et al. .............. 426/152 X
3,780,188   12/1973   Tsen et al. .......................... 426/152

*Primary Examiner*—James R. Hoffman
*Attorney, Agent, or Firm*—M. Howard Silverstein; William Takacs; Max D. Hensley

[57] ABSTRACT

The quality of protein-fortified baked goods is improved by incorporation of certain additives into the dough prior to baking. The additives are fatty acid esters of polyoxyethylene ethers of either propylene glycol glycosides or glycerol glycosides.

6 Claims, No Drawings

PROCESS FOR IMPROVING QUALITY OF PROTEIN-FORTIFIED BAKED GOODS

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to the production of protein-fortified bread and other related baked products, especially those of the yeast-leavened type. A particular object of the invention is to produce protein-fortified baked goods having improved properties. Further objects of the invention will be evident from the following description wherein parts and percentages are by weight unless otherwise specified.

In the following description, emphasis is directed to the production of bread. This is by way of illustration and not limitation. In its broad ambit the invention is applicable to baked goods of all kinds, particularly yeast-leavened products, such as rolls, buns, sweet rolls, and coffee cakes as well as bread.

Of increasing concern is the lack of nutritional balance in foods consumed by both the American and foreign public. More specifically, inadequate levels of dietary protein have prompted public demand for high-protein, low-calorie foods. One way to supplement the public's diet with extra protein is to enrich food products that are already accepted and widely used, such as baked goods, especially bread. Many protein supplements, for example, soy protein, are available for fortifying such baked products. However, incorporation of these protein supplements produces deleterious effects on the properties of the baked goods. For example, soy-fortified bread exhibits such undesirable characteristics as diminished loaf volume and poor crumb grain.

The invention described herein provides means for obviating the problems outlined above. In accordance with the invention certain additives are incorporated in the dough prior to baking, whereby to yield protein-fortified baked products of excellent quality. For example, application of the invention permits one to readily produce protein-fortified baked goods having proper loaf volume, crumb grain, and texture.

The additives used in accordance with the invention fall into two categories, namely, (a) fatty acid esters of polyoxyethylene ethers of propylene glycol glycosides and (b) fatty acid esters of polyoxyethylene ethers of glycerol glycosides. Particularly preferred are the compounds derived from starch, and these are referred to herein as (a) fatty acid esters of polyoxyethylene ethers of propylene glycol-starch glycosides and (b) fatty acid esters of polyoxyethylene ethers of glycerol-starch glycosides.

In the additives of the invention, the fatty acids contain 12 to 18 carbon atoms, and examples thereof include lauric, myristic, palmitic, stearic, palmitoleic, and oleic acids. It is critical for the purpose of the invention that the proportion of combined fatty acid be limited to 1 to 2 moles thereof per mole of glycoside. Also critical for the purpose of the invention is that the polyoxyethylene portion of the compounds be limited to 5 to 20 moles of combined ethylene oxide per mole of glycoside.

The additives used in accordance with the invention can be prepared by known procedures, for example, those described by Otey, Mehltretter, and Rist, Jour. Am. Oil Chem. Soc., Vol. 40, pp. 76–78 and Griffin, U.S. Pat. No. 2,407,003. Neither the additives per se nor their preparation constitute any part of the invention. For the sake of clarifying the nature of the additives, however, a brief description of their synthesis is set forth below, wherein glycerol derivatives are referred to for purpose of illustration. It will be understood that the propylene glycol derivatives are prepared in similar manner.

In a first step of the synthesis glycerol is reacted with a sugar such as glucose, fructose, galactose, inverted sucrose, xylose, or the like. In general, the glycerol and sugar are combined in approximately mole-to-mole ratio, but an excess of glycerol is usually preferred. A small amount of an added catalyst is added and the reactants are heated to a temperature of 100°–140° C. This temperature is maintained until equilibrium is attained, a state generally reached in from 10 to 120 minutes. For synthesizing the preferred additives of the invention, starch is used in place of a sugar. Under the influence of the acidic conditions of the reaction, the starch is degraded and the resulting degradation products, including glucose and oligomers of glucose, react with the glycerol. The resulting glycerol-starch glycoside is a mixture of glycerol glucoside together with other glycerol glycosides wherein the glycoside moieties are oligosaccharide radicals containing several combined glucose units.

In a next step the so-formed glycerol glycoside is converted to a polyoxyethylene ether. In this aspect of the preparation, glycerol glycoside is reacted with ethylene oxide at a temperature preferably in the range of 120°–140° C. The ethylene oxide must be added slowly to avoid exceeding the temperature range given above. Compounds suitable as additives in the instant invention involve preferably reaction of one mole of glycerol glycoside with from 5 to 20 moles of ethylene oxide. In this respect care must be exercised in that production of polyoxyethylene ethers with less than 5 moles or more than 20 moles of ethylene oxide per mole of glycoside will result in final compounds that are not effective in avoiding impairment of baking performance.

The final step is the production of the fatty acid ester of the so-prepared polyoxyethylene ether. Fatty acids that can be used in this step include lauric, myristic, palmitic, stearic, palmitoleic, and oleic acids. In general, either saturated or unsaturated long-chain fatty acids may be employed. The acid is reacted with the intermediate in a ratio of 1–2 moles of acid per mole of glycoside. The reaction is generally carried out at temperatures from 180° to 200° C.

As noted hereinabove, the advantages of the present invention are secured by incorporating any of the above-described additives into the dough prior to baking. The amount of additive can be varied from about 0.1 to 5 parts thereof per 100 parts of flour. A preferred amount is about 0.5 parts per 100 parts of flour. The dough into which our novel additives are incorporated will contain the protein-fortifying agent and the usual ingredients for making baked goods as well-known in the art. Basic ingredients are flour, yeast, water, and salt. Other ingredients which may be added are, for example, milk, sugar, shortening, eggs, etc., depending on the type of baked product to be obtained.

Any suitable recipes for baked goods may be utilized in the process of the invention, and it is the intention of the invention to cover the preparation of a wide range of protein-fortified baked goods, including breads, rolls, buns, sweet rolls, coffee cakes, etc. The procedures used in preparing baked goods in accordance with the invention include the usual operations well-known in the art, for example, mixing, fermentation, kneading, shaping, proofing, and baking.

In a practice of the invention, the protein fortification is effectuated by adding a conventional protein concentrate directly to the dough, or it may be incorporated with the flour prior to preparation of the dough. Examples of protein concentrates are substances containing about 20 to 90% protein, such as soy flour, isolated soy protein, sodium soy proteinate, defatted cottonseed flour, non-fat dry milk, air-fractionated wheat flour, defatted wheat germ, torula yeast, expeller-extracted sesame seed flour, fish protein concentrate, wheat gluten, and the like. In general, the protein concentrate is used, in a proportion of about 4 to 16 parts per 100 parts of wheat flour.

The invention is further demonstrated by the following illustrative examples.

EXAMPLE 1

Loaves of bread were prepared using as additives palmitic and stearic acid esters of polyoxyethylene ethers of propylene glycol-starch glycosides which contained varying proportions of combined fatty acid and oxyethylene groups.

In the bread-baking tests a procedure was used in which two loaves of bread were generated from each batch.

In order to provide a sensitive test to detect improvements in loaf volume attributable to additives of the invention, a basic formula giving a very low loaf volume was employed.

The following is a list of the ingredients used to prepare the bread:

| Wheat flour, All-purpose Export | 94% | 200 g. |
|---|---|---|
| Soy flour, Bakers Nutrisoy | 6% | |
| Yeast, Bakers compressed | 2.5%* | 5 g. |
| Salt | 2.0%* | 4 g. |
| Sugar | 4.0%* | 8 g. |
| Water | 59.0%* | 118 g. |
| Additive | 0.5%* | 1 g. |

* % of wheat-soy flour blend

The additive was dispersed in some of the water with slight heating prior to being incorporated with the other ingredients of the dough.

For comparative purposes, runs were made wherein lard (0.5%, 1 g.) was substituted for the additive, and wherein neither additive nor lard was added.

The ingredients were mixed together on a National mixer and developed into a dough over a 5-minute period. The dough was scaled and two 150 g. pieces were formed, rounded by hand, and fermented for 105 minutes at 86° F. When fermentation was complete, the dough was run through rollers set at 9/32 inch apart. Following a relaxation period of 20 minutes at 86° F., the dough was passed once through rollers set at 9/32 inch apart and once through rollers set at 3/16 inch apart. Then, the dough was curled by hand with slight pressure, proofed for 55 minutes, and finally baked for 25 minutes at 425° F.

Loaf volumes were determined by standard procedures. Also, the loaves were examined and the crumb grain rated on a numerical basis wherein 15 is the maximum score.

The additives used and the results obtained are summarized in the following table.

Table 1

| Additive | Composition of additive | | Loaf volume[1] (ml.) | Volume[2] increase (%) | Grain score[3] |
|---|---|---|---|---|---|
| | Acid | Ethylene oxide | | | |
| | (Moles per mole of glycoside) | | | | |
| Palmitic[4] | 1 | 5.0 | 560 | 39 | 12 |
| do. | 1 | 10.1 | 572 | 42 | 12 |
| do. | 0.9 | 19.9 | 540 | 34 | 11 |
| Stearic[4] | 1 | 5.0 | 560 | 39 | 12 |
| do. | 0.9 | 10.1 | 568 | 40 | 12 |
| do. | 0.9 | 19.9 | 548 | 36 | 12 |
| Lard | — | — | 488 | 21 | 10.5 |
| Control (No additive, no lard) | — | — | 404[5] | — | 9 |

[1]Average of 2 loaves.
[2]Based on volume of control.
[3]Maximum score = 15.
[4]Ester of polyoxyethylene propylene glycol-starch glycoside derived from named fatty acid.
[5]Average of 7 loaves.

EXAMPLE 2

Loaves of bread were prepared using the same procedure as in Example 1, with the following exceptions: The additive was the palmitic acid ester of polyethylene ether of propylene-starch glycoside, wherein the proportions of combined palmitic acid and ethylene oxide were 1 and 10.1 moles, respectively, per mole of glyceride. The additive was used in varying proportions, i.e., 0.1, 0.3, and 0.5% of the flour blend. For comparative purposes runs were made wherein lard was substituted for the additive and used in varying proportions. In a control run, neither additive nor lard was used.

The results obtained are tabulated below.

Table II

| Additives | Proportion of additive % of flour blend | Loaf volume ml. (Average of 2) | Volume increase, % over control | Grain score (15 maximum) |
|---|---|---|---|---|
| Palmitic[1] | 0.1 | 475 | 17 | 10 |
| do. | 0.3 | 580 | 42 | 11.5 |
| do. | 0.5 | 582 | 43 | 11.5 |
| Lard | 0.5 | 488 | 20 | 10.5 |
| do. | 1.0 | 525 | 29 | 11.5 |
| do. | 2.0 | 550 | 35 | 11.5 |
| do. | 3.0 | 565 | 38 | 11.5 |
| Control (No additive, no lard) | — | 408 | — | 9 |

[1]Palmitic acid ester of polyoxyethylene ether of propylene glycol-starch glycoside.

EXAMPLE 3

Loaves of bread were prepared using the same procedure as in Example 1, with the following exceptions: In this case the additives were fatty acid esters of polyoxyethylene ethers of glycerol-starch glycoside, which contained varying proportions of combined fatty acid and ethylene oxide. The additives were employed in the same proportion as in Example 1, namely, 1 g. or 0.5%. For comparative purposes, runs were made wherein lard was substituted for the additive and used in the same proportion, 1 g. or 0.5%. In a control run, neither additive nor lard was used.

The additives used and the results obtained are summarized in the following table.

Table III

| Additive | Composition of additive | | Loaf volume[1] (ml.) | Volume[2] increase (%) | Grain score[3] |
|---|---|---|---|---|---|
| | Acid | Ethylene oxide | | | |
| | (Moles per mole of glycoside) | | | | |
| Lauric[4] | 1 | 5.2 | 600 | 49 | 11.5 |
| do. | 0.9 | 9.6 | 590 | 46 | 11.5 |
| do. | 1 | 19.6 | 552 | 37 | 10 |
| Oleic[4] | 0.9 | 5.2 | 595 | 47 | 11.5 |
| do. | 0.9 | 9.6 | 572 | 42 | 11.5 |
| do. | 0.8 | 19.6 | 578 | 43 | 11 |
| do. | 1.9 | 5.2 | 442 | 10 | 9.5 |
| do. | 1.7 | 9.6 | 568 | 41 | 11.5 |
| do. | 1.8 | 19.6 | 590 | 46 | 12 |
| Stearic[4] | 1 | 5.2 | 588 | 46 | 11.5 |
| do. | 0.8 | 9.6 | 588 | 46 | 11.5 |
| do. | 1 | 19.6 | 565 | 40 | 11 |
| do. | 1.9 | 19.6 | 572 | 42 | 11 |
| Lard | — | — | 488 | 21 | 10.5 |
| Control (No additive, no lard) | — | — | 404[5] | — | 9 |

[1]Average of 2 loaves.
[2]Based on volume of control.
[3]Maximum score = 15.
[4]Ester of polyoxyethylene glycerol-starch glycoside derived from named fatty acid.
[5]Average of 7 loaves.

Having thus described the invention, what is claimed is:

1. A process for the preparation of yeast-leavened baked goods of wheat flour fortified with a protein concentrate, comprising
    incorporating into the raw dough mixture, prior to baking, an additive which is
    an ester of a fatty acid containing 12 to 18 carbon atoms and a polyoxyethylene ether of a propylene glycol glycoside, containing 1 to 2 moles of combined fatty acid per mole thereof, and 5 to 20 moles of combined ethylene oxide per mole thereof,
    said additive being incorporated in a concentration of about from 0.1 to 5 parts thereof per 100 parts of flour.

2. A process for the preparation of yeast-leavened baked goods of wheat flour fortified with a protein concentrate, comprising
    incorporating into the raw dough mixture, prior to baking, an additive which is
    an ester of a fatty acid containing 12 to 18 carbon atoms and a polyoxyethylene ether of a glycerol glycoside, containing 1 to 2 moles of combined fatty acid per mole thereof, and 5 to 20 moles of combined ethylene oxide per mole thereof,
    said additive being incorporated in a concentration of about from 0.1 to 5 parts thereof per 100 parts of flour.

3. A process for the preparation of yeast-leavened baked goods of wheat flour fortified with about 4 to 16 parts of a protein concentrate per 100 parts of flour, comprising
    incorporating into the raw dough mixture prior to baking, an additive which is
    an ester of a fatty acid containing 12 to 18 carbon atoms and a polyoxyethylene ether of propylene glycol-starch glycoside, containing 1 to 2 moles of combined fatty acid per mole thereof, and 5 to 20 moles of combined ethylene oxide per mole thereof,
    said additive being incorporated in a concentration of about from 0.1 to 5 parts thereof per 100 parts of flour.

4. A process for the preparation of yeast-leavened baked goods of wheat flour fortified with about 4 to 16 parts of a protein concentrate per 100 parts of flour, comprising
    incorporating into the raw dough mixture, prior to baking, an additive which is
    an ester of a fatty acid containing 12 to 18 carbon atoms and a polyoxyethylene ether of glycerol-starch glycoside, containing 1 to 2 moles of combined fatty acid per mole thereof, and 5 to 20 moles of combined ethylene oxide per mole thereof,
    said additive being incorporated in a concentration about from 0.1 to 5 parts thereof per 100 parts of flour.

5. Yeast-leavened baked goods from wheat flour dough fortified with about 4 to 16 parts of a protein concentrate per 100 parts of flour, said dough further containing about from 0.1 to 5 parts of an additive per 100 parts of flour,
    said additive being an ester of a fatty acid containing 12 to 18 carbon atoms and a polyoxyethylene ether of propylene glycol-starch glycoside, containing 1 to 2 moles of combined fatty acid per mole thereof, and 5 to 20 moles of combined ethylene oxide per mole thereof.

6. Yeast-leavened baked goods from wheat flour dough fortified with about 4 to 16 parts of a protein concentrate per 100 parts of flour, said dough further containing about from 0.1 to 5 parts of an additive per 100 parts of flour,
    said additive being an ester of a fatty acid containing 12 to 18 carbon atoms and a polyoxyethylene ether of glycerol-starch glycoside, containing 1 to 2 moles of combined fatty acid per mole thereof, and 5 to 20 moles of combined ethylene oxide per mole thereof.

* * * * *